US011089161B2

(12) United States Patent
Jensen

(10) Patent No.: US 11,089,161 B2
(45) Date of Patent: Aug. 10, 2021

(54) AUTOMATED MESSAGE GENERATION TO A SUBJECT MATTER EXPERT IN RESPONSE TO A PHONE CALL

(71) Applicant: Carl N. Jensen, Palm Coast, FL (US)

(72) Inventor: Carl N. Jensen, Palm Coast, FL (US)

(*) Notice: Subject to any disclaimer, the term of this patent is extended or adjusted under 35 U.S.C. 154(b) by 0 days.

(21) Appl. No.: 16/742,262

(22) Filed: Jan. 14, 2020

(65) Prior Publication Data

US 2020/0228658 A1 Jul. 16, 2020

Related U.S. Application Data

(60) Provisional application No. 62/792,077, filed on Jan. 14, 2019.

(51) Int. Cl.
*H04M 3/523* (2006.01)
*H04M 3/42* (2006.01)
*H04M 3/51* (2006.01)

(52) U.S. Cl.
CPC ..... *H04M 3/5231* (2013.01); *H04M 3/42034* (2013.01); *H04M 3/42102* (2013.01); *H04M 3/5166* (2013.01); *H04M 3/5183* (2013.01); *H04M 2201/39* (2013.01); *H04M 2201/60* (2013.01)

(58) Field of Classification Search
CPC ........... H04M 3/5231; H04M 3/42034; H04M 3/42102; H04M 3/5166; H04M 3/5183; H04M 15/62; H04M 2201/39; H04M 2201/60
USPC ........................................ 379/88.18, 207.11
See application file for complete search history.

(56) References Cited

U.S. PATENT DOCUMENTS

| | | | | |
|---|---|---|---|---|
| 2008/0021786 A1* | 1/2008 | Stenberg | ............ | G06Q 30/0239 705/14.39 |
| 2008/0114733 A1* | 5/2008 | Friesenhahn | ....... | G06F 16/2228 |
| 2010/0150333 A1* | 6/2010 | Goodman | ............... | G10L 13/00 379/207.02 |
| 2011/0167456 A1* | 7/2011 | Kokenos | ................ | G06Q 30/06 725/60 |
| 2013/0124366 A1* | 5/2013 | Breed | ................ | G06Q 30/0623 705/26.61 |
| 2013/0208879 A1* | 8/2013 | Rosenhaft | ............ | G06Q 20/382 379/207.11 |
| 2014/0109118 A1* | 4/2014 | Kokenos | ................ | G06Q 30/06 725/5 |
| 2019/0012756 A1* | 1/2019 | Han | ........................ | G06T 19/20 |
| 2020/0153960 A1* | 5/2020 | Knuth | ................ | H04L 65/4084 |
| 2021/0042784 A1* | 2/2021 | Doumar | ........... | H04N 21/47815 |

* cited by examiner

*Primary Examiner* — Binh Kien Tieu
(74) *Attorney, Agent, or Firm* — Withrow & Terranova, PLLC

(57) ABSTRACT

Automated message generation to a subject matter expert in response to a phone call is provided. A computing device receives a message identifying a telephone call that terminates at the computing device based on a destination number. Caller identification information, comprising at least a calling device number, is determined based on the message. An item identifier (ID) associated with the telephone call is determined. Information about an item that corresponds to the item ID is accessed. The information is sent to the calling device number. A message that includes the calling device number and item information that identifies the item is sent to a contact device.

20 Claims, 6 Drawing Sheets

AUTOMATED MESSAGE GENERATION TO A SUBJECT MATTER EXPERT IN RESPONSE TO A PHONE CALL

RELATED APPLICATION

This application claims the benefit of U.S. Provisional Application No. 62/792,077, filed on Jan. 14, 2019, entitled "AUTOMATIC GENERATION AND COMMUNICATION OF MESSAGES CONTAINING INFORMATION DERIVED FROM A CALLED TELEPHONE NUMBER," the disclosure of which is hereby incorporated herein by reference in its entirety.

BACKGROUND

Often individuals will have an interest in a topic at a time when subject matter experts knowledgeable on that topic are unavailable.

SUMMARY

The embodiments disclosed herein automatically, in response to a phone call from an individual regarding a topic, generate and distribute messages to one or more computing devices, such as a smart phone or desktop computer, of one or more corresponding subject matter experts who have information about a topic of interest of the caller. The subject matter experts may then engage the individual either substantially concurrently with the time of the telephone call, or subsequently.

In one embodiment a method is provided. The method includes receiving, by a computing device, a message identifying a telephone call that terminates at the computing device based on a destination number. The method further includes determining, by the computing device, based on the message, caller identification information comprising at least a calling device number. The method further includes determining an item identifier (ID) associated with the telephone call. The method further includes accessing information about an item that corresponds to the item ID. The method further includes sending, to the calling device number, the information about the item. The method further includes sending, to a contact device, a message that includes the calling device number and item information that identifies the item.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Often individuals will have an interest in a topic at a time when subject matter experts knowledgeable on that topic are unavailable. The topic could be related to science, such as topics about whales, mammals, or the like, or related to entertainment, such as topics about movies, television shows, plays or the like, or product related, such as topics about items for sale, such as vehicles, homes, retail items, or the like.

Often, at the time the individual's interest is piqued, a subject matter expert may not be available to provide information about the topic. For example, the time of the individual's interest may be during non-working hours of a museum, or a movie theater, or a realtor's office.

The embodiments disclosed herein automatically, in response to a phone call from an individual regarding a topic, generate and distribute messages to one or more computing devices, such as a smart phone or desktop computer, of one or more corresponding subject matter experts who have information about a topic of interest of the caller. The subject matter experts may then engage the individual either substantially concurrently with the time of the telephone call, or subsequently.

Figure 1:
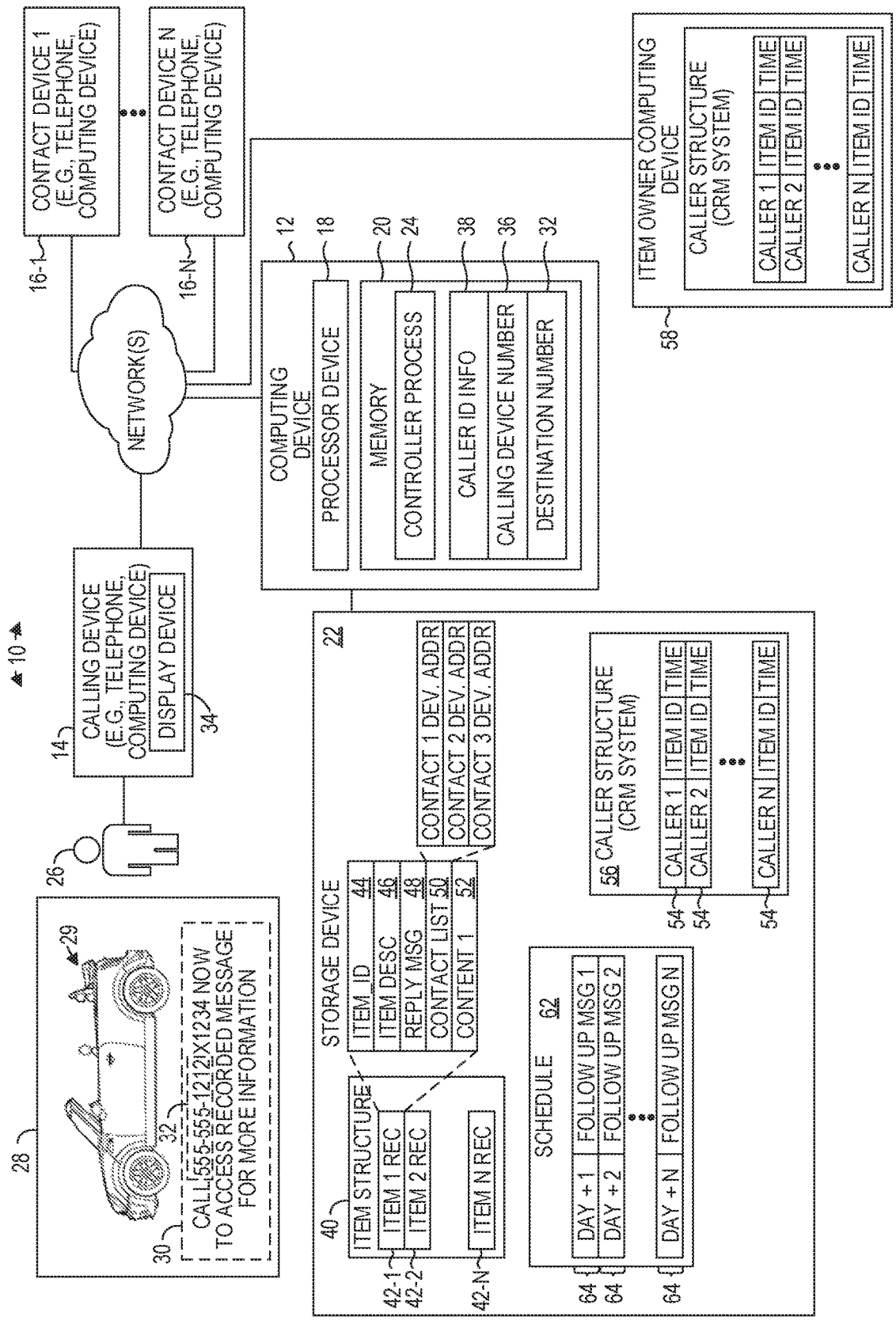
FIG. 1 is a block diagram of an environment in which embodiments may be practiced.

FIG. 1 is a block diagram of an environment 10 in which embodiments may be practiced. The environment 10 includes a computing device 12, a calling device 14 and one or more contact devices 16-1-16-N that correspond to subject matter experts. The computing device 12 includes a processor device 18, a memory 20, and includes, or is communicatively coupled to, a storage device 22. The memory 20 includes a controller process 24 which implements portions of the functionality described herein.

It should be noted that because the controller process 24 is a component of the computing device 12, functionality implemented by the controller process 24 may be attributed to the computing device 12 herein. Moreover, in examples where the controller process 24 comprises software instructions that program the processor device 18 to carry out functionality discussed herein, functionality implemented by the controller process 24 may be attributed herein to the processor device 18.

A user 26 associated with the calling device 14 views a message 28 describing an item 29. While in this example the item 29 is an automobile, the embodiments are not limited to any particular types of items, and can apply to any item, including, by way of non-limiting example, a topic of science, a topic of entertainment, a product for sale, or the like, about which the user 26 may be interested in obtaining information. The message 28 includes a textual message 30 that identifies a destination telephone number 32 (hereinafter, "destination number 32") and a 4 digit item identifier (in this example, 1234). The message 28 may be presented in a paper form, or on a display device 34 of the calling device 14, or on some other display device. The user 26 manipulates the calling device 14 to initiate a telephone call to the destination number 32. The destination number 32 terminates at the computing device 12. The computing device 12 receives a message characterizing the telephone call. The message includes caller information, such a calling device number 36 of the calling device 14, and, optionally, caller identification information 38 associated with the calling device number 36, such as a name or other information associated with a registered user/owner of the calling device 14.

The computing device 12 determines an item identifier (ID) that identifies an item associated with the telephone call. In some embodiments, the destination number 32 may itself comprise the item ID of the item. In other embodiments, the computing device 12 may query the calling device 14 for additional information to obtain the item ID, such as, in this example, by requesting a 4 digit item ID. In particular, the computing device 12 may send an audio message to the calling device 14 requesting that the user 26 enter the 4 digit item ID associated with a particular item in which the user 26 is interested. In this example, based on the message 28, the user 26 enters the digits "1234". Thus, in this example, the item ID comprises "1234".

The computing device 12 accesses an item structure 40 that comprises a plurality of item records 42-1-42-N. Each item record 42 includes an item ID field 44 that comprises a unique item identifier (ID) (in this example, "1234") that corresponds to a particular item, an item description field 46 that contains a description regarding the corresponding item, a reply message field 48 that identifies a message to be played back to a calling device, a contact list 50 that identifies one or more contact device addresses of contact devices 16 to be notified upon receiving a telephone call regarding the item, and a content field 52 that contains information about the corresponding item, such as may be used to generate, for example, the textual message 30. The contact device addresses may comprise, for example, email addresses or telephone numbers of computing devices, such as smart phones and/or computing devices, of subject matter experts knowledgeable about the item of interest.

Based on the item ID, the controller process 24 determines that the item record 42-1 corresponds to the item 29. The controller process 24 accesses the reply message field 48 of the item record 42-1 to obtain the appropriate reply message, and plays the reply message to the calling device 14. The reply message may be, for example, an audio file or a textual message. If the reply message is a textual message, the controller process 24 may utilize text-to-voice functionality to play back an audio message. The computing device 12 may also generate and send an SMS message to the calling device 14 with information about the item 29.

The computing device 12 may generate a caller record 54 in a caller structure 56 that identifies the calling device number 36, the item ID, and the time and date of the telephone call. The computing device 12 may also generate a message, such as an email or the like, that includes the information in the caller record 54 and send the message to a remote device 58 to inform the remote device 58 of the call.

The reply message may include information about the item 29, such as factual data about the item 29. The controller process 24 may also allow the user 26 to interact with an interactive voice response system to facilitate additional actions, such as being connected to a contact person, to record a message, or the like.

The controller process 24 generates a message, such as, by way of non-limiting example, an SMS message, that includes the calling device number 36, and, if available, the caller identification information 38, and information about the item 29 such as the item identifier contained in the item ID field 44 and/or the item description contained in the item description field 46. The controller process 24 sends the message to each contact device 16 via the contact device addresses identified in the contact list 50 of the item record 42-1.

Subsequently, in accordance with a schedule 62 and based on the time and date of the telephone call, the controller process 24 may send additional follow-up messages 64-1-64-N, such as in the form of SMS messages, to the calling device 14 about the item 29.

Figure 2:
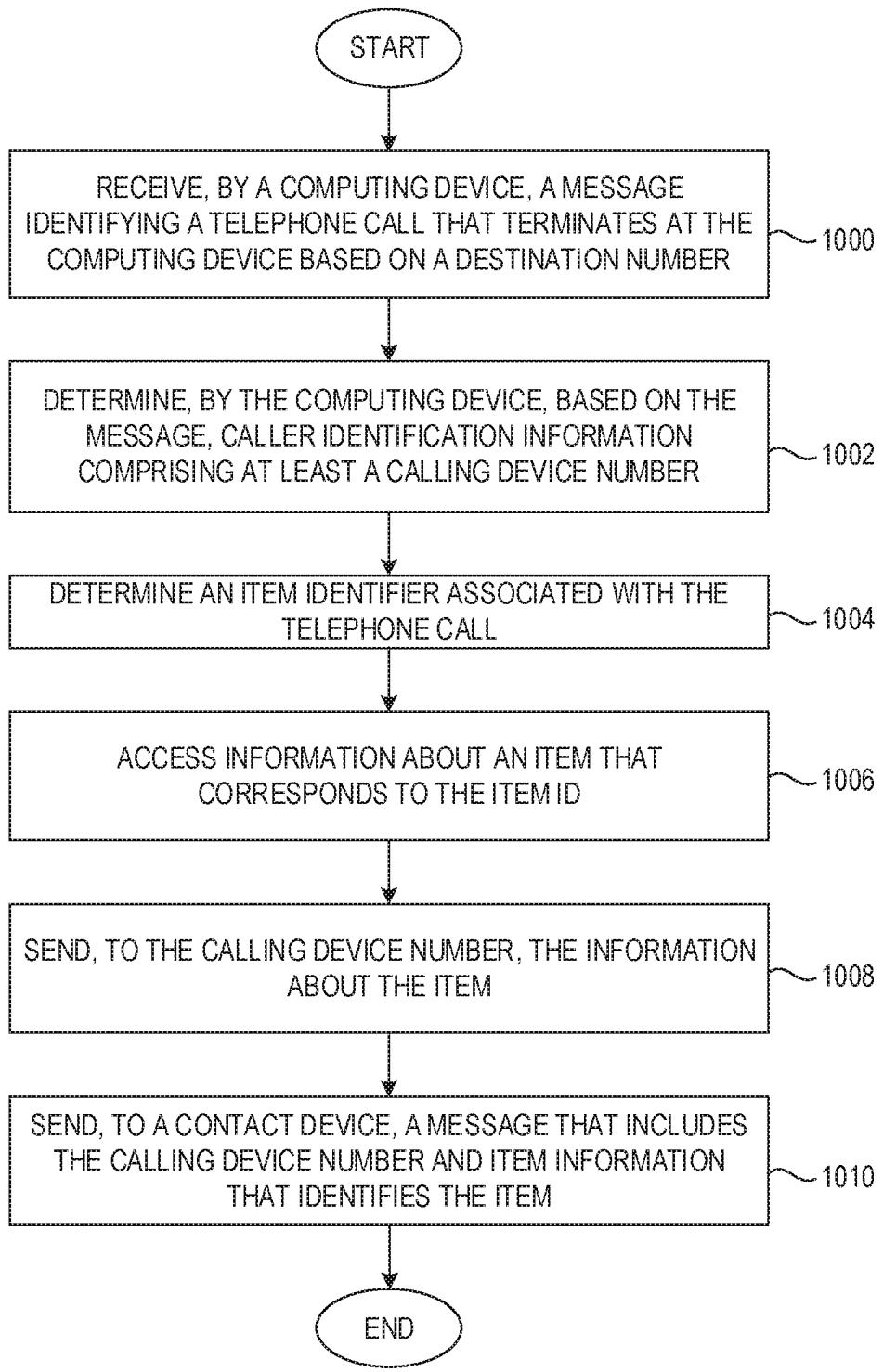
FIG. 2 is a flowchart of a method for automatic generation and communication of messages containing information derived from a called telephone number according to one embodiment.

FIG. 2 is a flowchart of a method for automatic generation and communication of messages containing information derived from a called telephone number according to one embodiment. FIG. 2 will be discussed in conjunction with FIG. 1. The computing device 12 receives the message identifying the telephone call that terminates at the computing device 12 based on the destination number 32 (FIG. 2, block 1000). The computing device 12 determines, based on the message, the caller identification information 38 comprising at least the calling device number 36 (FIG. 2, block 1002). The computing device 12 determines the item ID associated with the telephone call (FIG. 2, block 1004). The computing device 12 accesses information about the item 29 that corresponds to the item ID (FIG. 2, block 1006). The computing device 12 sends, to the calling device number 36, the information about the item (FIG. 2, block 1008). The computing device 12 sends, to a contact device, a message that includes the calling device number 36 and item information that identifies the item 29 (FIG. 2, block 1010). A subject matter expert associated with the contact device may then follow-up with the caller regarding the item 29 using the calling device number 36.

Figure 3:
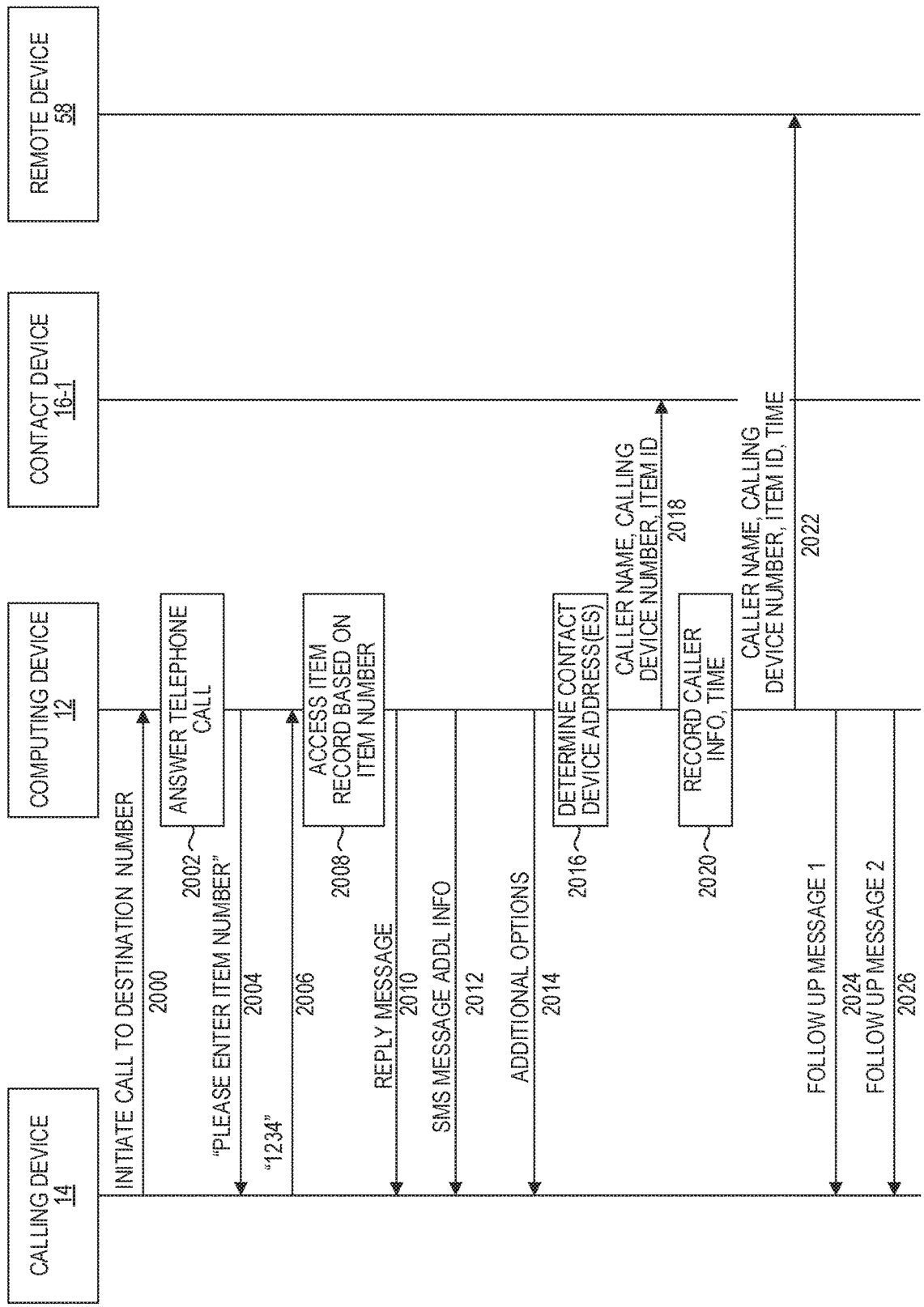
FIG. 3 is a message sequence diagram illustrating example messages communicated between and actions taken during automatic generation and communication of messages containing information derived from a called telephone number according to one embodiment.

FIG. 3 is a message sequence diagram illustrating example messages communicated between and actions taken during automatic generation and communication of messages containing information derived from a called telephone number according to one embodiment. The calling device 14 initiates a telephone call that identifies a telephone number that terminates at the computing device 12 (FIG. 3, step 2000). The computing device 12 answers the call (FIG. 3, step 2002). In this embodiment, the computing device 12 sends a prerecorded message to the calling device 14 that requests a 4 digit number, which will serve as the item ID (FIG. 3, step 2004). The calling device 14 receives input from the user 26 and sends a 4 digit number to the computing device 12 (FIG. 3, step 2006). The computing device 12 accesses the item record 42-1 that corresponds to the item ID provided by the calling device 14 (FIG. 3, step 2008). The computing device 12 communicates the reply message contained in the reply message field 48 of the item record 42-1 to the calling device 14 (FIG. 3, step 2010).

The computing device 12 may send a message, such as an SMS message, to the calling device 14 containing information about the item 29 (FIG. 3, step 2012). The computing device 12 may then provide additional options to the calling device 14, such as an ability to leave a message, talk to an individual, or any other desired action (FIG. 3, step 2014). The computing device 12 may then determine one or more contact device addresses that correspond to contact devices 16 (FIG. 3, step 2016). In some embodiments, the contact device addresses may be identified in the contact list 50 of the item record 42-1. In other embodiments, the contact device addresses may be global, and may apply to all item records 42.

The computing device 12 generates a message that includes the calling device number of the calling device 14, item information about the item associated with the with phone call, such as the item ID, and, if available, the caller name, and sends the message to the one or more contact device addresses (FIG. 3, step 2018). The messages may be emails, SMS messages, or the like. The computing device 12 generates a caller record 54 that identifies the caller, such as by the calling device number, identifies the item associated with the phone call, and identifies the date and time of the call (FIG. 3, step 2020). The computing device 12 may also send the information stored in the caller record 54 to the remote device 58 (FIG. 3, step 2022). In accordance with the schedule 62, the computing device 12 may periodically send follow up messages, such as SMS messages, to the calling device 14 (FIG. 3, steps 2024-2026). Note that each of the actions taken by the computing device 12, described above, are taken automatically, without human involvement.

Figure 4:
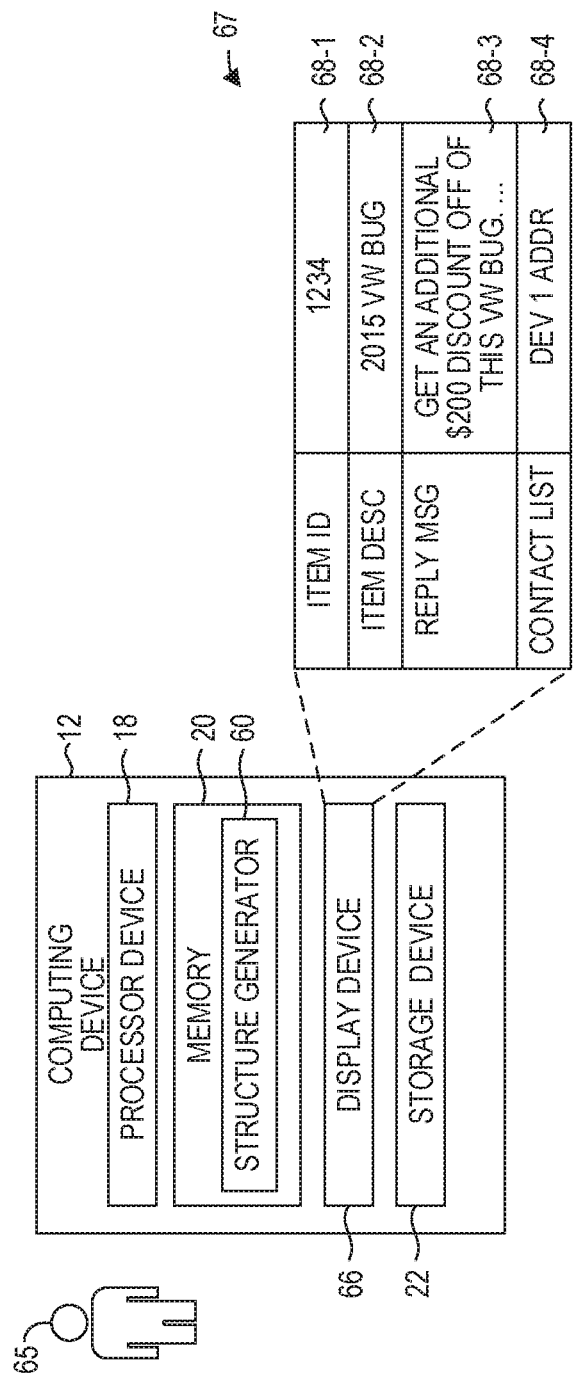
FIG. 4 is a block diagram of the computing device 12 according to another embodiment.

FIG. 4 is a block diagram of the computing device 12 according to another embodiment. In this embodiment, the computing device 12 includes a structure generator 60 configured to generate certain of the structures identified in FIG. 1. An operator or administrator 65 interacts with the structure generator 60, such as via a user interface, and indicates a desire to add a new item record 42 to the item structure 40 (FIG. 1). In response, the structure generator 60 presents, on a display device 66, a user interface 67 that contains a plurality of initially empty fields 68-1-68-4. The administrator 65 enters, in the field 68-1, an item ID that will correspond to the new item. The administrator 65 enters, in the field 68-2, a description of the new item. The administrator 65 enters, in the field 68-3, a textual reply message that will be played back, utilizing text-to-voice technology, when a calling device initiates a telephone call to the computing device 12 regarding the new item. The administrator 65 enters, in the field 68-4, one or more contact device addresses, such as telephone numbers. The structure generator 60 generates a new item record 42 based on the information entered into the fields 68-1-68-4, and stores the item record 42 in the item structure 40.

Figure 5:
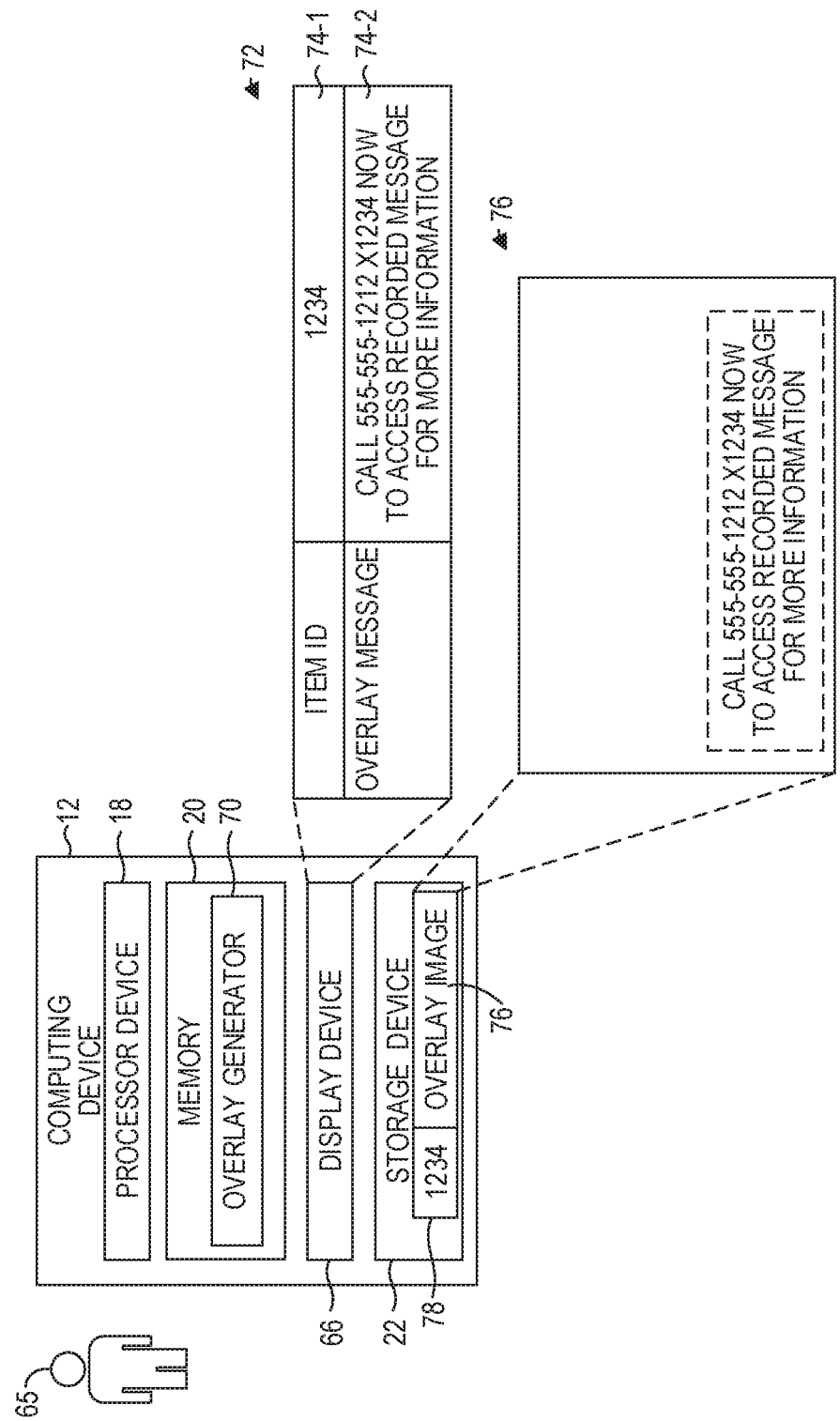
FIG. 5 is a block diagram of the computing device 12 according to another embodiment.

FIG. 5 is a block diagram of the computing device 12 according to another embodiment. In this embodiment, the computing device 12 includes an overlay generator 70 configured to generate image overlays that can be later combined with imagery of an item to generate a message, such as the message 28 illustrated in FIG. 1. The administrator 65 interacts with the overlay generator 70, such as via a user interface, and indicates a desire to generate a new overlay image. In response, the overlay generator 70 presents, on the display device 66, a user interface 72 that contains a plurality of initially empty fields 74-1-74-2. The administrator 65 enters, in the field 74-1, an item ID that identifies the item to which the image overlay will correspond. The administrator 65 enters, in the field 74-2, the desired message. The overlay generator 70 renders an overlay image 76 that contains the message entered into the field 74-2 that can be combined with an image of an item. The overlay generator 70 generates an image overlay record 78 that includes the item ID and the overlay image 76.

Figure 6:
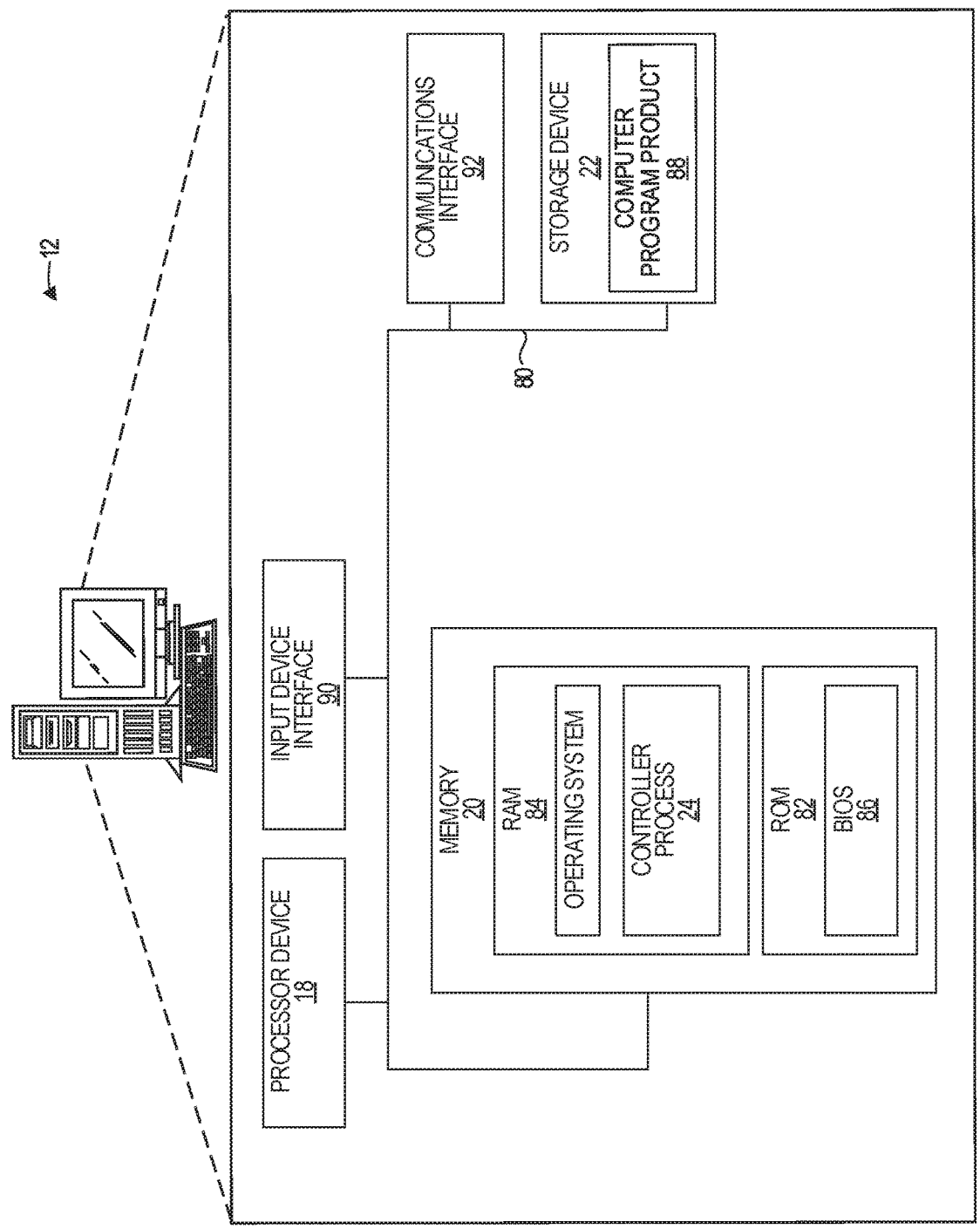
FIG. 6 is a block diagram of the computing device 12 according to one example.

FIG. 6 is a block diagram of the computing device 12 according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 18, the system memory 20, and a system bus 80. The system bus 80 provides an interface for system components including, but not limited to, the system memory 20 and the processor device 18. The processor device 18 can be any commercially available or proprietary processor.

The system bus 80 may be any of several types of bus structures that may further interconnect to a memory bus (with or without a memory controller), a peripheral bus, and/or a local bus using any of a variety of commercially available bus architectures. The system memory 20 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the computing device 12. The volatile memory 84 may also include a high-speed RAM, such as static RAM, for caching data.

The computing device 12 may further include or be coupled to a non-transitory computer-readable storage medium such as the storage device 22, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 22 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 22 and in the volatile memory 84, including an operating system and one or more program modules, such as the controller process 24, which may implement the functionality described herein in whole or in part.

All or a portion of the examples may be implemented as a computer program product 88 stored on a transitory or non-transitory computer-usable or computer-readable storage medium, such as the storage device 22, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The processor device 18, in conjunction with the controller process 24 in the volatile memory 84, may serve as a controller, or control system, for the computing device 12 that is to implement the functionality described herein.

An operator may also be able to enter one or more configuration commands through a keyboard (not illustrated) or a pointing device such as a mouse (not illustrated). Such input devices may be connected to the processor device 18 through an input device interface 90 that is coupled to the system bus 80 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 92, such as an Ethernet transceiver, suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a computing device, a message identifying a telephone call that terminates at the computing device based on a destination number;
   determining, by the computing device, based on the message, caller identification information comprising at least a calling device number;
   determining an item identifier (ID) associated with the telephone call;
   accessing information about an item that corresponds to the item ID;
   sending, to the calling device number, the information about the item;
   accessing a data structure that correlates the item ID to a contact device telephone number of a contact device;
   determining, based on the data structure and the item ID, the contact device telephone number; and
   sending, to the contact device via the contact device telephone number, an SMS message that includes the calling device number and item information that identifies the item.

2. The method of claim 1 wherein determining the item ID associated with the telephone call comprises determining a destination telephone number associated with the telephone call.

3. The method of claim 1 wherein determining the item ID associated with the telephone call comprises:
   sending a prerecorded message to a calling device; and
   receiving the item ID from the calling device in response to the prerecorded message.

4. The method of claim 1 wherein accessing the information about the item that corresponds to the item ID further comprises:
   accessing a plurality of item records, each item record corresponding to a different item and having a unique item ID; and
   selecting the item record that corresponds to the item ID.

5. The method of claim 1 wherein sending, to the calling device number, the information about the item further comprises:
   accessing an item record based on the item ID;
   extracting, from the item record, a reply message; and
   sending the reply message to the calling device number.

6. The method of claim 5 wherein sending the reply message to the calling device number comprises utilizing a text-to-voice translator to play the reply message to the calling device number.

7. The method of claim 1 wherein the data structure correlates the item ID to a plurality of contact device telephone numbers, and further comprising:
   accessing the data structure to identify the plurality of contact device telephone numbers; and
   wherein sending, to the contact device via the contact device telephone number, the SMS message that includes the calling device number and item information that identifies the item further comprises sending, to each of the plurality of contact device telephone numbers, the SMS message.

8. A computing device, comprising:
   a memory; and
   a processor device coupled to the memory configured to:
   receive a message identifying a telephone call that terminates at the computing device based on a destination number;
   determine, based on the message, caller identification information comprising at least a calling device number;
   determine an item identifier (ID) associated with the telephone call;
   access information about an item that corresponds to the item ID;
   send, to the calling device number, the information about the item;
   access a data structure that correlates the item ID to a contact device telephone number of a contact device;
   determine, based on the data structure and the item ID, the contact device telephone number; and
   send, to the contact device, via the contact device telephone number, an SMS message that includes the calling device number and item information that identifies the item.

9. The computing device of claim 8 wherein to determine the item ID associated with the telephone call, the processor device is further configured to determine a destination telephone number associated with the telephone call.

10. The computing device of claim 8 wherein to determine the item ID associated with the telephone call, the processor device is further configured to:
    send a prerecorded message to a calling device; and
    receive the item ID from the calling device in response to the prerecorded message.

11. The computing device of claim 8 wherein to access the information about the item that corresponds to the item ID, the processor device is further configured to:
    access a plurality of item records, each item record corresponding to a different item and having a unique item ID; and
    select the item record that corresponds to the item ID.

12. The computing device of claim 8 wherein to send, to the calling device number, the information about the item, the processor device is further configured to:
- access an item record based on the item ID;
- extract, from the item record, a reply message; and
- send the reply message to the calling device number.

13. The computing device of claim 12 wherein to send the reply message to the calling device number, the processor device is further configured to utilize a text-to-voice translator to play the reply message to the calling device number.

14. The computing device of claim 8 wherein the data structure correlates the item ID to a plurality of contact device telephone numbers, and wherein the processor device is further configured to:
- access the data structure to identify the plurality of contact device telephone numbers; and
- wherein to send, to the contact device via the contact device telephone number, the SMS message that includes the calling device number and item information that identifies the item, the processor device is further configured to send, to each of the plurality of contact device telephone numbers, the SMS message.

15. A computer program product stored on a non-transitory computer-readable storage medium and including instructions configured to cause a processor device to:
- receive a message identifying a telephone call that terminates at a computing device based on a destination number;
- determine, based on the message, caller identification information comprising at least a calling device number;
- determine an item identifier (ID) associated with the telephone call;
- access information about an item that corresponds to the item ID;
- send, to the calling device number, the information about the item;
- send, to a contact device, a message that includes the calling device number and item information that identifies the item;
- generate, by the computing device, a schedule that identifies future dates on which a follow up message regarding the item will be sent to the calling device number; and
- send, by the computing device in accordance with the schedule, a plurality of follow up messages regarding the item to the calling device number.

16. The computer program product of claim 15 wherein to determine the item ID associated with the telephone call, the instructions are further configured to cause the processor device to determine a destination telephone number associated with the telephone call.

17. The computer program product of claim 15 wherein to determine the item ID associated with the telephone call, the instructions are further configured to cause the processor device to:
- send a prerecorded message to a calling device; and
- receive the item ID from the calling device in response to the prerecorded message.

18. The computer program product of claim 15 wherein to access the information about the item that corresponds to the item ID, the instructions are further configured to cause the processor device to:
- access a plurality of item records, each item record corresponding to a different item and having a unique item ID; and
- select the item record that corresponds to the item ID.

19. The computer program product of claim 15 wherein to send, to the calling device number, the information about the item, the instructions are further configured to cause the processor device to:
- access an item record based on the item ID;
- extract, from the item record, a reply message; and
- send the reply message to the calling device number.

20. The computer program product of claim 19 wherein to send the reply message to the calling device number, the instructions are further configured to cause the processor device to utilize a text-to-voice translator to play the reply message to the calling device number.

* * * * *